US009503433B2

(12) United States Patent
Nayshtut et al.

(10) Patent No.: US 9,503,433 B2
(45) Date of Patent: Nov. 22, 2016

(54) METHOD AND APPARATUS FOR CLOUD-ASSISTED CRYPTOGRAPHY

(71) Applicant: Intel Corporation, Santa Clara, CA (US)

(72) Inventors: Alex Nayshtut, Gan Yavne (IL); Omer Ben-Shalom, Rishon Le-Tzion (IL); Ned M. Smith, Hillsboro, OR (US); Edward V. Jimison, Jr., Folsom, CA (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 14/227,319

(22) Filed: Mar. 27, 2014

(65) Prior Publication Data

US 2015/0281189 A1 Oct. 1, 2015

(51) Int. Cl.
*H04L 29/06* (2006.01)
*H04L 9/08* (2006.01)

(52) U.S. Cl.
CPC ........... *H04L 63/045* (2013.01); *H04L 9/0822* (2013.01); *H04L 9/0825* (2013.01); *H04L 2463/062* (2013.01)

(58) Field of Classification Search
CPC .................................................. H04L 63/0435
See application file for complete search history.

(56) References Cited

U.S. PATENT DOCUMENTS

| | | | | |
|---|---|---|---|---|
| 6,098,056 A * | 8/2000 | Rusnak | ............... | G06Q 20/3821 705/75 |
| 6,424,718 B1 * | 7/2002 | Holloway | ............. | G06F 21/606 380/277 |
| 8,074,083 B1 * | 12/2011 | Lee | ........... | G06F 21/10 713/194 |
| 2011/0289310 A1 | 11/2011 | Selgas | | |
| 2011/0296201 A1 | 12/2011 | Monclus | | |
| 2012/0072722 A1 * | 3/2012 | Adams | ................ | G06F 21/6218 713/160 |
| 2013/0191629 A1 * | 7/2013 | Treinen | ..................... | H04L 9/08 713/153 |
| 2014/0013406 A1 * | 1/2014 | Tremlet | .................. | G06F 21/32 726/5 |
| 2014/0019753 A1 | 1/2014 | Lowry | | |
| 2014/0050317 A1 | 2/2014 | Sabin | | |
| 2014/0082364 A1 | 3/2014 | Cucinotta | | |
| 2014/0189359 A1 * | 7/2014 | Marien | ................. | H04L 9/3234 713/172 |
| 2014/0201524 A1 * | 7/2014 | Dittrich | ................... | G06F 21/45 713/165 |
| 2015/0079933 A1 * | 3/2015 | Smith | ..................... | H04W 4/02 455/411 |
| 2015/0149772 A1 * | 5/2015 | Leavy | ................... | H04L 9/0822 713/168 |

OTHER PUBLICATIONS

Ryan, Mark D. "Cloud computing security: The scientific challenge, and a survey of solutions." Journal of Systems and Software 86.9 (2013): 2263-2268.*

(Continued)

*Primary Examiner* — Shawnchoy Rahman
(74) *Attorney, Agent, or Firm* — Trop, Pruner & Hu, P.C.

(57) ABSTRACT

In an embodiment, a system includes a processor that includes private key decryption logic to decrypt an encrypted private key received from a consuming device to produce a private key, and symmetric key decryption logic to receive the private key from the private key decryption logic and to decrypt an encrypted symmetric key received from the consuming device using the private key. The system also includes a dynamic random access memory (DRAM) coupled to the processor. Other embodiments are described and claimed.

16 Claims, 8 Drawing Sheets

(56) References Cited

OTHER PUBLICATIONS

International Searching Authority, "Notification of Transmittal of the International Search Report and the Written Opinion of the International Searching Authority," mailed Jun. 29, 2015, in International application No. PCT/US2015/022916.

Ideler, Hugo, "Cryptography as a service in a cloud computing environment," Master's Thesis, Eindhoven University of Technology, Department of Mathematics and Computing Science, 126 pages, Dec. 2012.

Taiwan Intellectual Property Office, Official Letter mailed Jan. 14, 2016 in Taiwan Patent Application No. 101404390.

* cited by examiner

METHOD AND APPARATUS FOR CLOUD-ASSISTED CRYPTOGRAPHY

TECHNICAL FIELD

Embodiments pertain to cloud-assisted cryptography.

BACKGROUND

Sharing private keys securely between computational devices can present a challenge due to a need for both secure distribution and secure storage of the keys on all devices. One solution is key synchronization between trusted platform modules (TPMs), e.g., as defined by the Trusted Computing Group (TCG), but this solution is typically complex, costly, and may require specific hardware on all endpoints. As a result, there is no straightforward way to consume information that is protected by public key cryptography on endpoints without implementation of specific hardware and key synchronization methods.

Existing hardware security modules (HSMs) may be used by server platforms to remotely manage keys in a secure container that may also protect key operations such as encryption and signing. HSMs are typically expected to operate at highest levels of security because they manage keys for a large population. Hence, security requirements of the most secure use case become a minimum security requirement for the HSM, which can add significant cost and deployment lifecycle overhead.

DETAILED DESCRIPTION

Figure 1:
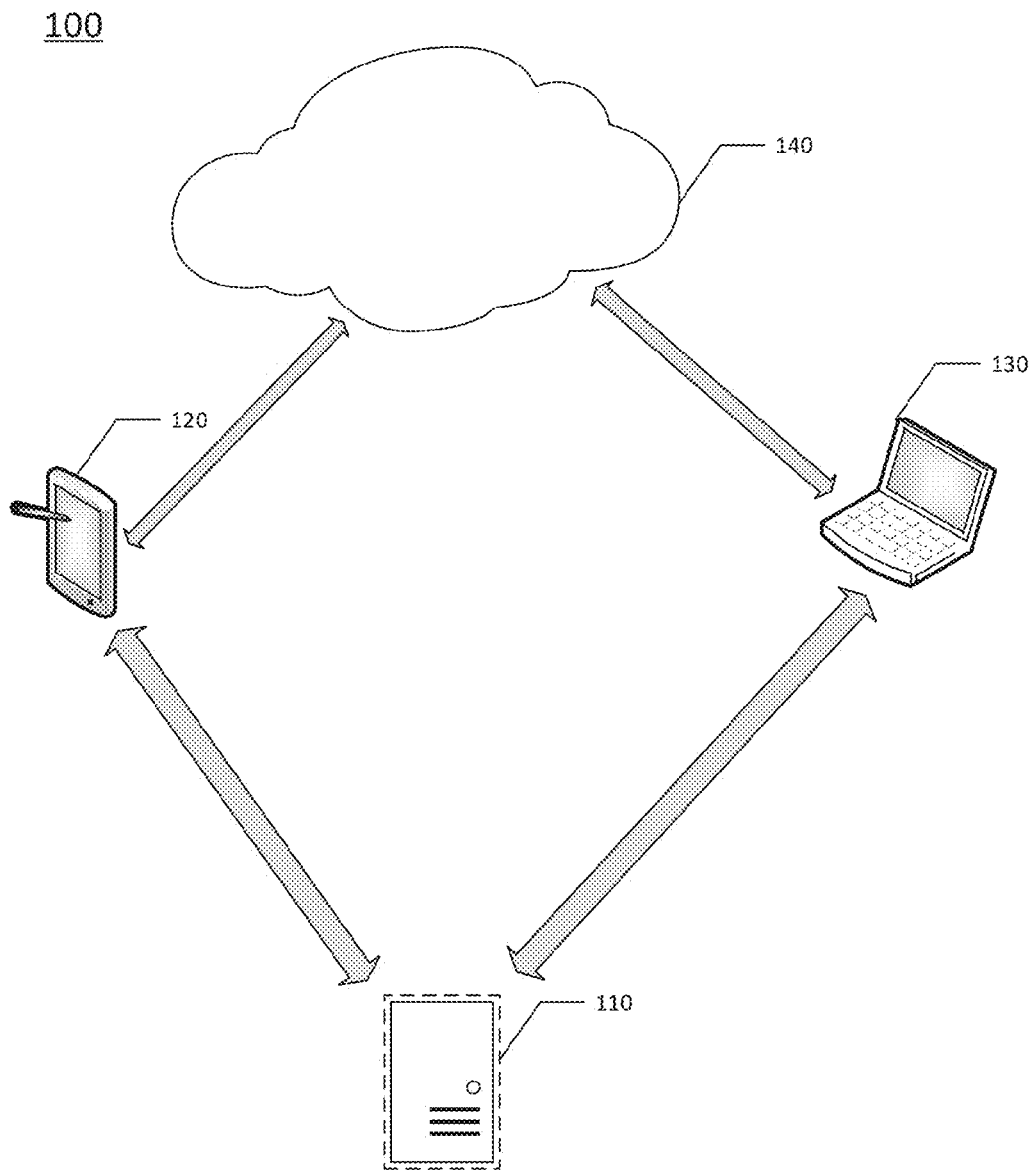
FIG. 1 is a block diagram of a system according to an embodiment of the present invention.

Methods and apparatus are presented that use distributed and cloud assisted techniques for enabling virtual TPM-like capabilities in a personal computational cloud ("personal cloud" or "cloud" herein) of platforms that perform cryptographic functions in the cloud on behalf of another endpoint, with cooperation between endpoints and the personal cloud instance on each operation. Through use of these techniques, neither a client nor a cloud instance can individually perform the cryptographic functions, and relevant private keys are not stored in clear text, or on either the endpoint or the cloud instance. Operations in the cloud may be executed in a trusted execution environment (TEE) with attestation. Attestation can ensure that for a specific cryptographic operation the private keys are not exposed outside the personal cloud. A three party algorithm may be implemented between a key owner, a device that requests cryptographic operations using the key, and the cloud system that performs the cryptographic operations.

Embodiments may be used in many different types of systems. For example, in one embodiment a communication device (e.g., phone, tablet computer, laptop computer, other computing device, etc.) can be arranged to perform various methods and techniques described herein. Note that the scope of the present invention is not limited to a communication device. Other embodiments can be directed to other types of apparatus for processing instructions. One or more machine readable media may include instructions that, in response to being executed on a computing device, cause the device to carry out one or more of the methods and techniques described herein.

In embodiments, a private key is protected by a public key of a cloud. The private key may be encrypted (e.g., to form an encrypted private key) such that only a cloud server can use it. To use the private key, the endpoint may send the encrypted private key to the cloud server that can extract the private key and use the extracted private key temporarily in a trusted execution environment as a proxy to the endpoint, and without storing the private key on the cloud server. Extraction of the private key may be conditional on the trusted execution environment (TEE) having met a secure hardening policy that may be established in part using an attestation of the server's TEE and user-specified hardening requirements.

Various client platforms may include TEE ingredients to implement the protocol; hence the role of 'server' ("consuming device") that implements the transitory operations may be performed by a variety of platforms including smartphones, tablets, ultrabooks, desktops, servers, virtualized servers and embedded systems. Such flexibility may be advantageous in heterogeneous computing environments, where there are platforms that do not have the TEE ingredients to implement the protocol, and may have varying degrees of trustworthy computing functionality. Users may continue to employ "weaker" devices (e.g., a consuming device) to access strongly protected data so long as they have access to some other device (e.g., cloud server) that has the TEE ingredients and can act as a replacement for native TEE capabilities.

Embodiments of the present invention may include a trustworthy agent discovery and plan execution protocol for a distributed system that includes personal cloud/device cluster nodes that may include virtualized environments. TEE-capable nodes may maintain redundant copies of data protection and identity keys so they remain highly available. A less capable node (e.g., a consuming device) may be used to manipulate sensitive data by accessing one of the TEE-capable nodes to perform encryption/decryption operations remotely.

In embodiments, a trustworthy agent discovery capability can identify less trustworthy nodes, which may be characterized by a trustworthiness rating. Data that is organized according to trustworthiness rating may be matched with consuming nodes of a similar trustworthiness rating. For example, a formal trust rating system may be employed, e.g., Clarke-Wilson, Biba, Take-Gant, Bell-LaPadula, Graham-Denning, and others.

Embodiments of the present invention may not utilize HSMs for transient nodes that would otherwise add cost and complexity. By not persisting any user-controlled personal cloud secret (e.g., symmetric key, private key, etc.) on the transient TEE nodes, an "attack surface" (e.g., vulnerability of the system) may be reduced. TEE attestation capability may be used to discover a suitability of nodes to function according a type of 'generating', 'transient,' or 'consuming' nodes in a user-controlled personal cloud or distributed system. Key provisioning may be performed using rights-managed policies, where a right to decrypt ("unwrap") the key to be provisioned may be bound to a TEE platform configuration register (PCR) that may describe a current operational state. For example, a PCR may be securely presented to the cloud server as proof of right to unwrap the key.

Node-type specific policies may accompany a wrapped key file "blob", e.g., binary large object.

According to one policy, a key provisioned to a transient node is to be deleted after the transactional key operation completes.

Less trustworthy nodes may participate without loss of trust in the personal cloud/distributed environment where the following conditions apply:

Consuming nodes may have a hardened device identification capability but do not have a general purpose TEE for storing/using data and user authentication keys.

Consuming nodes may have a trusted manageability subsystem that may be used to provision a temporal key (e.g., daily or hourly) that is then used to authenticate to transient nodes.

Embodiments may include the following components:
1. A public key infrastructure (PKI) capable of producing private/public key pairs.
2. An endpoint device with suitable cryptographically-enabled hardware, e.g. identity protection technology (IPT), trusted platform module (TPM), and/or HSM, capable of safekeeping its own private key and also capable of performing cryptographic operations (e.g. content encryption) with a known public key, e.g., belonging to another computer and/or user.
3. A cloud environment capable of launching code within a TEE and able to attest to the integrity of the execution environment (cloud environment) and code that runs within the cloud environment. This cloud environment is also able to perform various cryptographic operations.
4. Other devices (e.g., consuming devices) that want to delegate cryptographic operations to the cloud and may have relevant encrypted private keys in their possession.
5. A network capable of transferring data and metadata between endpoints and the cloud service.
6. A TEE capable of attesting TEE current configuration and hardening status.
7. The TEE with a platform configuration register (PCR) or virtual memory function instruction (VM_Func) capable of recording and reporting TEE memory breach events.
8. A protocol for discovering and categorizing nodes suitable for participation in a personal cloud model and for executing a key provisioning plan according to the categorization.

A PKI may generate keys for the endpoints. Each endpoint that has secure storage for keys may receive a respective private key, while each endpoint without secure storage may receive a copy of its respective private key that has been encrypted with a public key of the cloud service.

The generating endpoints may create content and may protect the content by creating a random symmetric key. The generating endpoint may then encrypt the content with the random symmetric key. The symmetric key may be encrypted by the respective private key, keeping the encrypted symmetric key with the content as metadata. The respective private key may be encrypted with the cloud service's public key.

In an embodiment, an endpoint that wants to use the encrypted content and that has its own private key may send the encrypted content including the metadata of the encrypted symmetric key, as well as its own encrypted private key, to the cloud so that the cloud can operate on the content on behalf of the endpoint. The cloud (e.g., virtual machine (VM)) can decrypt the encrypted private key (e.g., using a decrypting key of the cloud's public/private key cryptographic system). With the (unencrypted) private key, the cloud can decrypt the symmetric key and then can use that symmetric key to perform actions on behalf of a client (e.g. return the key, perform editing of file content in the cloud, execute the file content if it is executable content, render the file for secure remote viewing, etc.).

In another embodiment, another device, e.g., consuming device, may wish to access encrypted content that has been encrypted with a symmetric key. The consuming device has access to an encrypted symmetric key (encrypted with a private key) and an encrypted private key (the private key encrypted with the cloud computing service public key (PKI)). The consuming device can send the encrypted symmetric key and the encrypted private key to the cloud computing service (CCS). The CCS can decrypt the encrypted private key (e.g., using a decrypting key of the PKI of the CCS). With the (unencrypted) private key, the cloud can decrypt the encrypted symmetric key and return the (unencrypted) symmetric key to the consuming device, which can decrypt the encrypted content. Thus, although the consuming device is not able to directly decrypt the encrypted symmetric key in order to decrypt the encrypted content, the CCS can provide the (unwrapped) symmetric key to the consuming device.

FIG. 1 is a block diagram of a system 100, according to an embodiment of the present invention. The system 100 includes a (secure) endpoint device 110, a consuming device 120 (e.g., cellular phone or other user-interactive device, tablet computer smartphone, ultrabook, desktop computer, servers, virtualized server, embedded system, etc.), a generating device 130, and a cloud computational server (CCS) 140.

In operation, the generating device 130 may generate one or more keys. For example, the generating device 130 may generate a (random) symmetric key, a private key, public encryption key, etc., which may be requested by the endpoint device 110 that is able to safe keep its own private keys.

The consuming device 120 may receive from the endpoint device 110 an encrypted file that has been encrypted using the symmetric key. The endpoint device 110 may also send to the consuming device 120 (e.g., as metadata of the encrypted file), an encrypted symmetric key ("wrapped symmetric key") that has been encrypted with the private key received from the generating device 130. The consuming device 120 may also receive an encrypted private key ("wrapped private key"), which is the private key encrypted by PKI encryption (e.g., via a public key) that can be decrypted by the CCA 140.

The CCS 140 may have a security level deemed acceptable to exchange secure information with the consuming device 120. The consuming device 120 may send a request to the CCS 140 to decrypt the wrapped symmetric key. The request may include the wrapped symmetric key and the wrapped private key. The CCS 140 may have access to an asymmetric decrypting key (e.g., provided by the generating device 130) to decrypt the PKI-encrypted private key. The CCS 140 may decrypt the wrapped private key via use of the asymmetric PKI decrypting key, e.g., stored in a key vault of the CCS 140.

After unwrapping the wrapped private key, the CCS 140 may use the (unwrapped) private key to decrypt the wrapped symmetric key. After unwrapping the wrapped symmetric key, the CCS 140 may send the (unwrapped) symmetric key to the consuming device 120 in response to the request. The consuming device 120 may decrypt the encrypted data file using the symmetric key to produce a clear text file (e.g., decrypted file).

In some embodiments, the CCS 140 destroys any copies of the private key and of the symmetric key residing on the CCS 140 after having sent the symmetric key to the consuming device 120. Thus, the consuming device 120 can request the CCS 140 to decrypt the wrapped symmetric key needed for decryption of the encrypted data file, and the consuming device 120 can receive the (decrypted) symmetric key from the CCS 140 and decrypt the encrypted data file to access a decrypted data file (clear text file). No copies of the private key or of the symmetric key remain at the CCS 140 after the symmetric key is sent to the consuming device 120.

Figure 2:
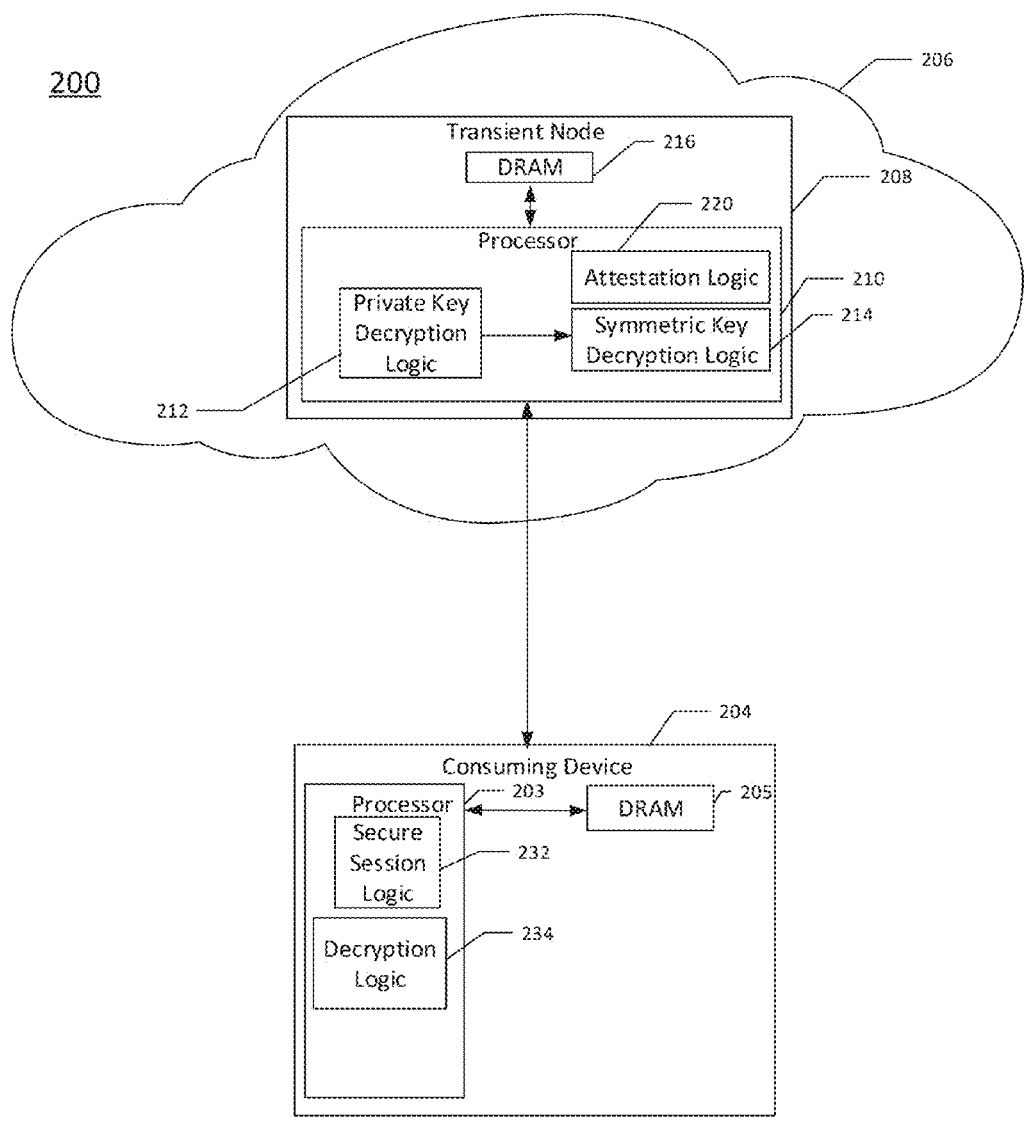
FIG. 2 is a block diagram of the system according to another embodiment of the present invention.

FIG. 2 is a block diagram of a system 200, according to an embodiment of the present invention. The system 200 includes a consuming device 204 and a cloud computing service (CCS) 206.

The consuming device 204 includes a processor 203 that includes secure session logic 232 and decryption logic 234, and the consuming device 204 also includes dynamic random access memory (DRAM) 205. The secure session logic 232 and the decryption logic 234 may be implemented in software, hardware, firmware, or a combination thereof.

The CCS 206 includes a transient node 208, and may include other transient nodes (not shown). The transient node 208 includes a processor 210 that includes private key decryption logic 212, symmetric key decryption logic 214, and attestation logic 220. The private key decryption logic 212, the symmetric key decryption logic 214, and the attestation logic 220 may each be implemented in software, hardware, firmware, or a combination thereof. The transient node 208 also includes DRAM 216 coupled to the processor 210 to store applications, data, etc. that are accessible by the processor 210.

In operation, the secure session logic 232 of the user device 202 may send a request to the consuming device 204 to open a secure session and may include an attestation request, e.g. to confirm a security level of the transient node 208. In response, the consuming device 204 may receive an attestation that is generated by the attestation logic 220 of the processor 210. The secure session logic 232 may establish a secure connection to the transient node 208 after attestation is received by the consuming device 204. The attestation may indicate a level of security of the CCS 206.

Upon receipt of the attestation by the consuming device 204, the secure session logic 232 may send a request to the transient node 208 to decrypt an encrypted data file. The secure session logic 232 may send to the transient node 208, metadata of the encrypted data file, e.g., an encrypted symmetric key (e.g., the symmetric key encrypted with a private key). The secure session logic 232 may also send to the transient node 208 a wrapped private key, e.g., the private key encrypted with a public key of the CCS 206.

At the transient node 208, the private key decryption logic 212 within the processor 210 may decrypt the private key using, e.g., an asymmetric decryption key associated with CCS public encryption (e.g., to decrypt the PKI-encrypted private key). In an embodiment, the asymmetric decryption key may be retrieved by the processor 210 from, e.g., a key storage (not shown).

After decrypting the encrypted private key, the (unencrypted) private key may be accessed by the symmetric key decryption logic 214 to decrypt the encrypted symmetric key. After the symmetric key is decrypted, the processor 210 may send the symmetric key to the consuming device 204. Decryption logic 234 within the processor 203 of the consuming device 204 may decrypt the encrypted data file using the symmetric key to produce a clear text file. After sending the symmetric key to the consuming device 204, the processor 210 of the transient node 208 may destroy the symmetric key and the private key that reside at the transient node 208. The secure session may be ended after the symmetric key is sent to the consuming device 204.

Figure 3:
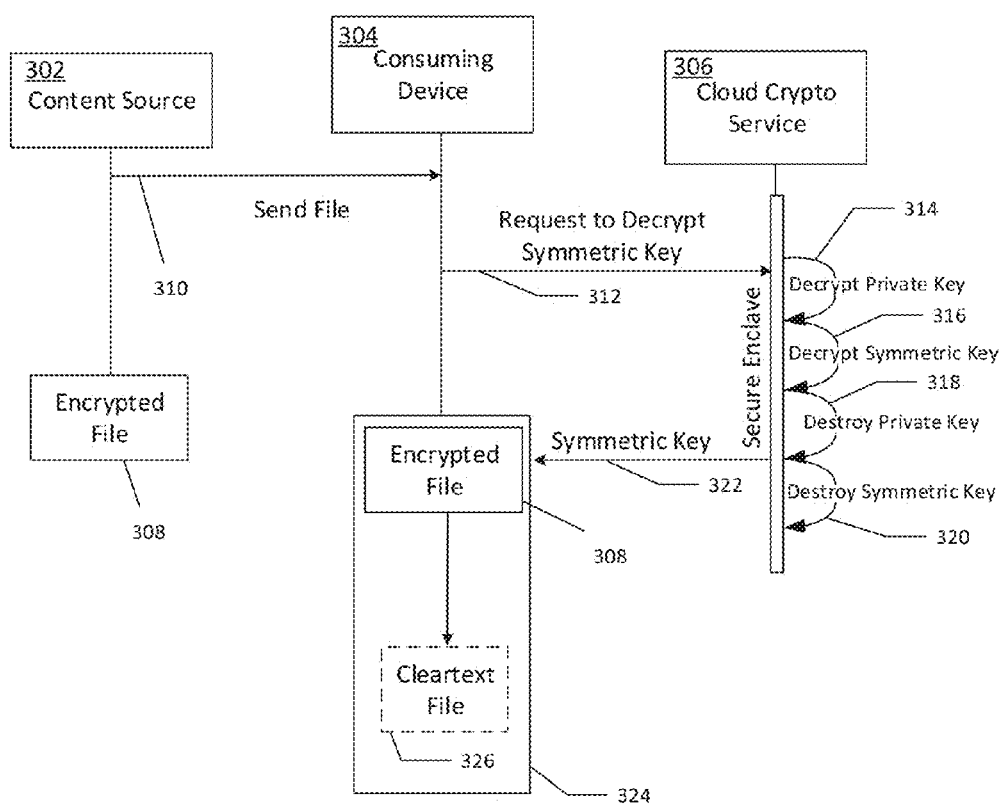
FIG. 3 is a flow diagram for a system according to embodiments of the present invention.

FIG. 3 is a flow diagram for a system according to embodiments of the present invention. A content source 302 may be a secure endpoint (e.g., supports secure key storage). The user 302 may send 310 an encrypted content file 308 to a consuming device 304 with a request 310 to decrypt the encrypted file 308. The encrypted file 308 may include metadata that includes an encrypted symmetric key, which has been encrypted using a private key. An encrypted private key, e.g. the private key encrypted using a public key of a cloud cryptographic service (CCS) 306 may also be sent to the consuming device 304 from the content source 302, which may not support secure key storage.

The consuming device 304 may send, to a cloud cryptographic service (CCS) 306, a request 312 to decrypt the wrapped symmetric key. The request may include the wrapped symmetric key and the wrapped private key. The CCS 306 can decrypt the wrapped private key 314 at a secure enclave of the CCS 306 using a PKI asymmetric private key (that may be retrieved from storage (e.g., a key vault, not shown). After decryption of the wrapped private key by the CCS 306, the (unwrapped) private key may be used to decrypt the wrapped symmetric key 316.

After decryption of the wrapped symmetric key, the symmetric key 322 may be returned to the consuming device 304. The consuming device 304, including processor 324, may decrypt the encrypted content file 308 to produce a decrypted content file 326, (e.g. clear text file). A copy of the private key that remains at the secure enclave of the CCS 306 may be destroyed 318 after the wrapped symmetric key is unwrapped. A copy of the symmetric key 320 that remains at the secure enclave of the CCS 306 may be destroyed 320, after the symmetric key 322 is provided to the consuming device 304.

Thus, decryption of the encrypted symmetric key at the secure enclave of CCS 306 enables an encrypted data file to be decrypted at the consuming device 304 without a need for the consuming device 304 to maintain trusted keys (e.g., private key or asymmetric PKI key). Copies of the private key and symmetric key that remain at the CCS 306 after the symmetric key has been sent to the consuming device 304 are destroyed.

Figure 4:
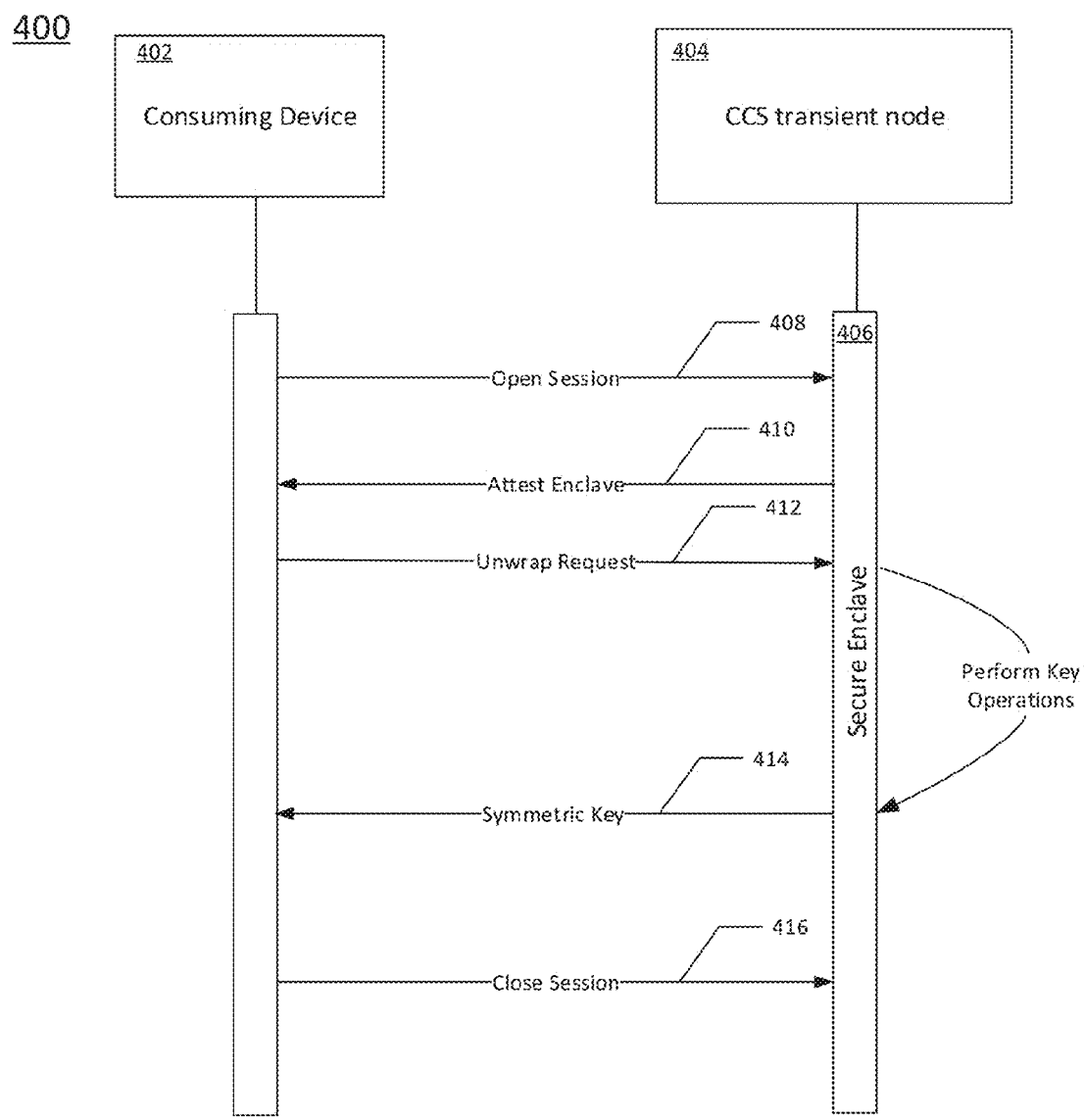
FIG. 4 is a flow diagram of attestation and key decryption according to an embodiment of the present invention.

FIG. 4 is a flow diagram of attestation and key decryption, according to an embodiment of the present invention. A consuming device 402 is to set up a secure session with a CCS transient node 404 of a cloud cryptographic service (CCS).

At 408, a session is opened between the consuming device 402 and a secure enclave 406 of the transient node 404. At 410, an attestation of a security level of the secure enclave of CCS transient node 404 of a CCS is returned to the consuming device 402. Upon verification by the consuming device 402 that the transient node 404 is authorized to receive an encrypted symmetric key for decrypting files (e.g., security level of the secure enclave meets a threshold level), the consuming device 402 sends an unwrap request 412 to the secure enclave to unwrap a wrapped private key (e.g., a private key wrapped using public key encryption) to produce the private key, and to unwrap an encrypted symmetric key (e.g. a symmetric key that is encrypted with the private key) to produce the symmetric key. After the decryption operations are performed, the (unwrapped) symmetric key is sent 414 to the consuming device 402. Upon receipt of the symmetric key, the consuming device 402 sends a command 416 to the secure enclave 406 to close the session.

Figure 5:
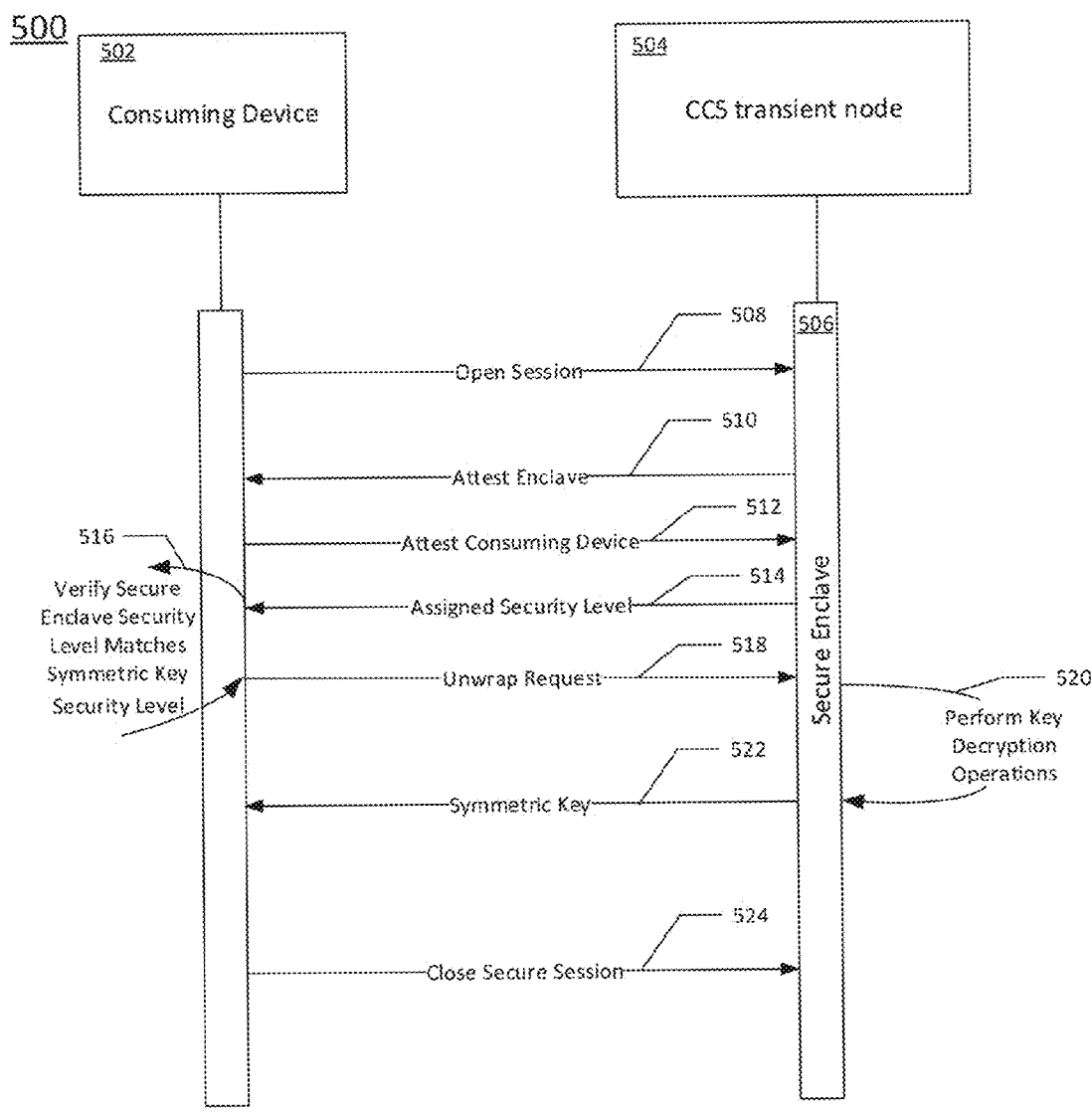
FIG. 5 is a flow diagram of an attestation and key decryption according to another embodiment of the present invention.

FIG. 5 is a flow diagram 500 of an attestation and key decryption, according to another embodiment of the present invention. At 508, a consuming device 502 opens a session with a secure enclave 506 of a transient node 504. At 510, an attestation of a security level of the secure enclave is sent from the secure enclave 506 to the consuming device 502. At 512, the consuming device 502 provides an attestation of a security level of the consuming device 502 to the transient node 504. The secure enclave 506 assigns a security level to the consuming device, based on the attestation received, at 514.

After the security level is assigned and a secure session is established, the consuming device 502 verifies 516 that the security level of the secure enclave 506 matches a security level of the wrapped symmetric key, and sends an unwrap request 518 to the secure enclave 506 to decrypt the wrapped symmetric key. The unwrap request 518 includes the wrapped symmetric key and a wrapped private key that is wrapped using public encryption of CCS transient node 504. At 520, the wrapped private key is unwrapped using PKI decryption (e.g., asymmetric private key of the CCS transient node 504), and the wrapped symmetric key is unwrapped using the (unwrapped) private key. At 522 the symmetric key 520 is sent to the consuming device 502. The consuming device 502 closes the secure session at 524.

Figure 6:
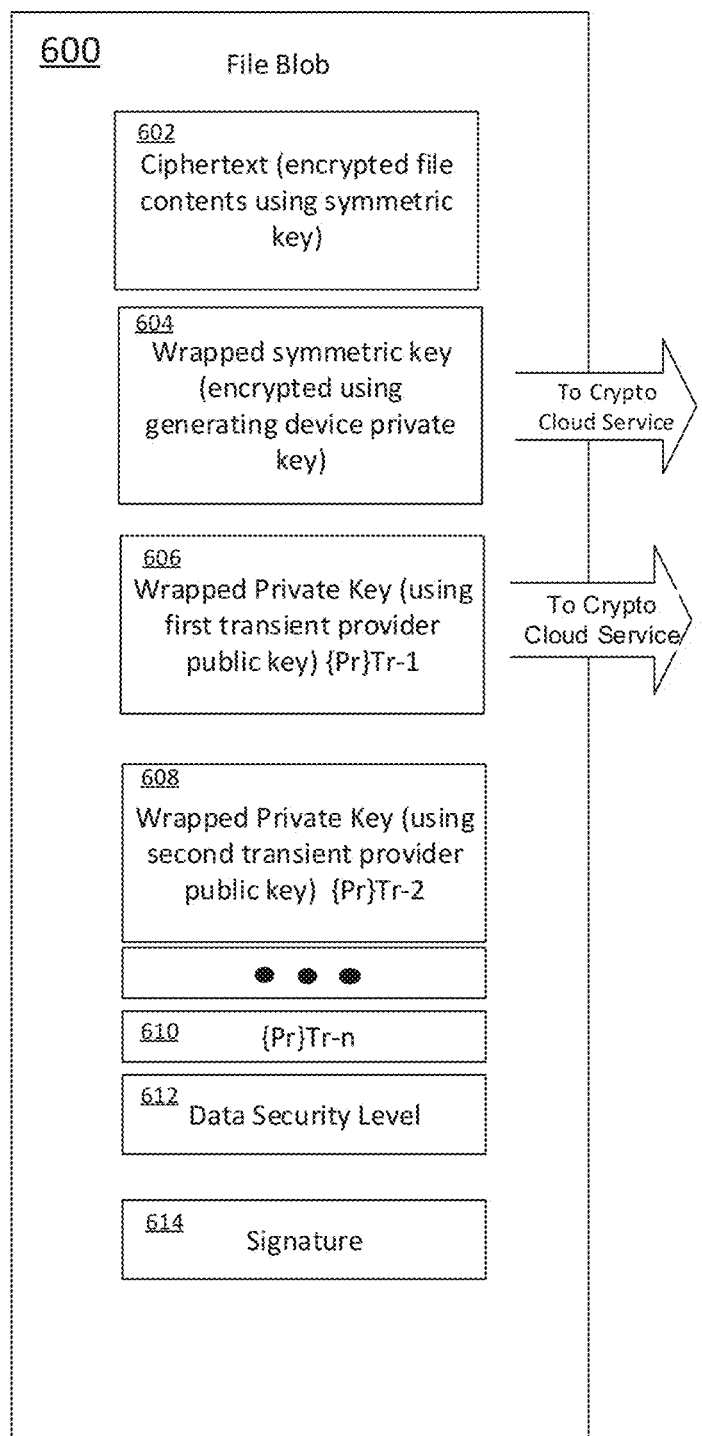
FIG. 6 is a block diagram of a file binary large object (blob), according to embodiments of the present invention.

FIG. 6 is a block diagram of a file binary large object ("blob") 600, according to embodiments of the present invention. The file blob 600 includes (encrypted) ciphertext 602, wrapped symmetric key 604, wrapped private keys 606-610, a data security level indicator 612, and a digital signature 614.

The ciphertext 602 includes data file contents that have been encrypted using a symmetric key. The symmetric key is wrapped using a private key (Pr) from a generating device and stored as wrapped symmetric key 604.

The private key Pr may be encrypted by each of a plurality of public keys, each public key associated with a different transient node of a cloud service provider. For example, each of public keys Tr-1, Tr-2, . . . Tr-n may be associated with a corresponding transient node, and each public key may be used to wrap the Pr key, to produce n wrapped keys {Pr} Tr-i (i=1, n). Each of the wrapped keys {Pr} Tr-i 606-610 may be stored in the file 600. Having multiple versions of the wrapped key {Pr} Tr-i (i=1, n) enables any one of the multiple transient nodes to be used to decrypt the symmetric key.

For example, wrapped key {Pr} Tr-1 has been encrypted by a first public key Tr-1 that is associated with a first transient node of a cloud cryptographic service (CCS, not shown). The first transient node has access to a first asymmetric key that permits decryption of {Pr} Tr-1, to produce the private key {Pr} that may be used to decrypted the wrapped symmetric key. Once unwrapped, the (unwrapped) symmetric key may be used to decrypt the encrypted data file, e.g., by sending the symmetric key to a trusted consuming device that decrypts the encrypted file.

Alternatively, the first transient node may receive the encrypted data file and may decrypt the encrypted data file using the (decrypted) symmetric key. Additionally, in various embodiments the first transient node may be able to alter (e.g., edit) content in the unencrypted data file, to execute executable content of the unencrypted data file, render a portion of contents of the file secure for secure remote viewing, etc.

In another example, wrapped key {Pr} Tr-2 has been encrypted by a second public key Tr-2 that is associated with a second transient node of the CCS. The second transient node has access to a second asymmetric key that permits decryption of {Pr} Tr-2, to produce the private key {Pr} that may be used to decrypted the wrapped symmetric key. Once unwrapped, the (unwrapped) symmetric key may be used to decrypt the encrypted data file, e.g., by sending the symmetric key to the trusted consuming device that decrypts the encrypted file.

In yet another example, a distributed execution plan may be used to schedule decryption operations over a pool of transient nodes as a result of the multiple copies of the wrapped symmetric key. For example, each of the encrypted private keys {Pr} Tr-i (i=1, n) may be able to be encrypted at a corresponding transient node only during a corresponding time period, e.g., a chronological schedule may determine which of the encrypted private keys 606-610 is to be sent to a corresponding transient node to be decrypted.

The file blob 600 may be signed using, e.g., a signature key 614 of the generating device so that a data security level 614 can be associated with the encrypted data and so the blob structure may not be tampered with post-construction. In operation, upon opening of a session between a consuming device and a transient node, the file blob 600 may be accessed by the consuming device, e.g., by establishing a security level of the consuming device that matches the security level of the signature 614. The ciphertext 602 may be accessed by the consuming device. The consuming device may retrieve the wrapped symmetric key 604 and one of the wrapped private keys 606-610, and may request that the wrapped symmetric key 604 be decrypted by a selected transient node of the plurality of transient nodes. After decrypting the symmetric key and sending the symmetric key to the consuming device, copies of the private key and symmetric key that remain on the selected transient node may be destroyed. After decryption of the encrypted data file at the consuming device using the symmetric key, the (decrypted) data file may be returned to an unsecured user.

Figure 7:
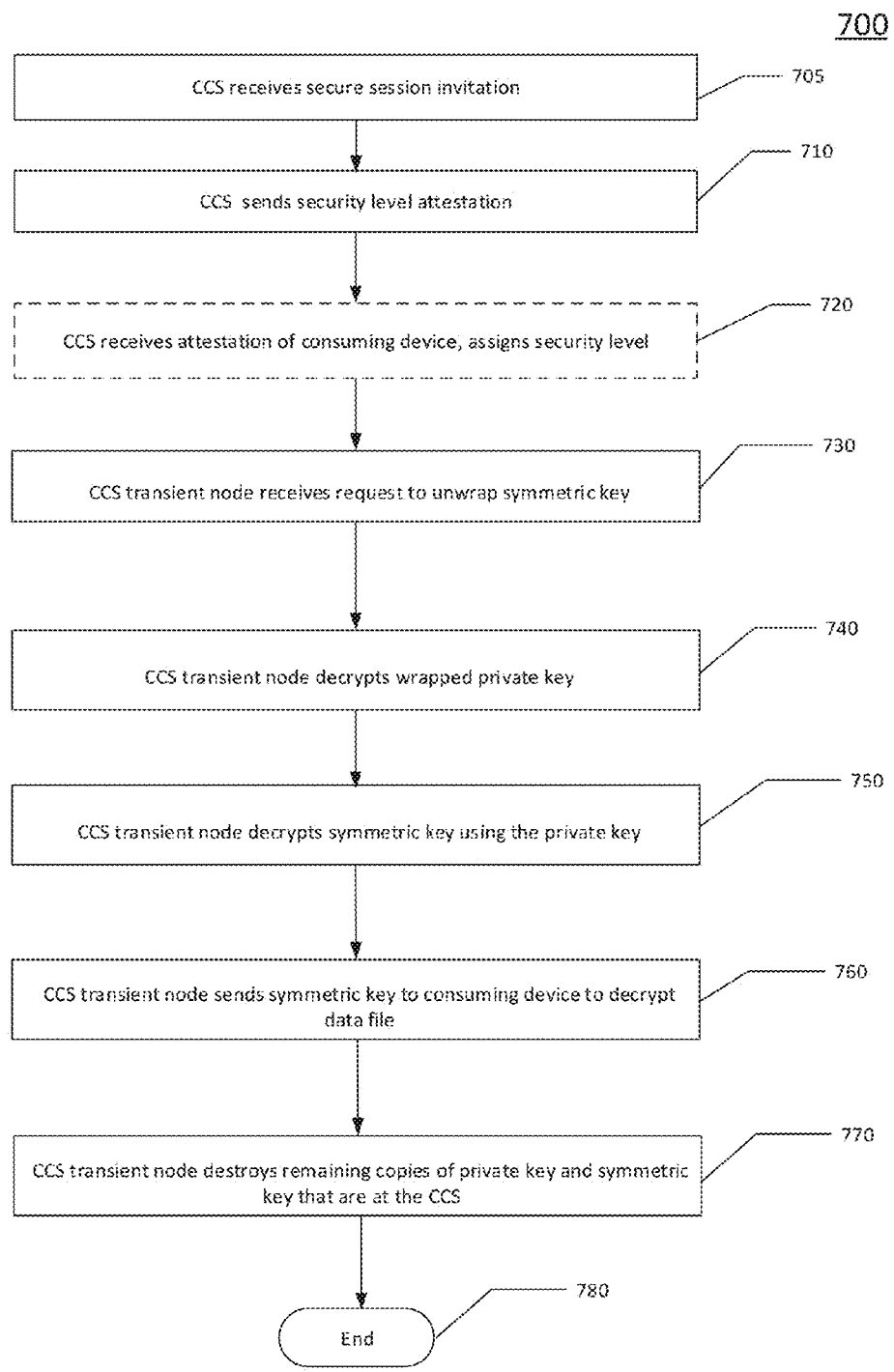
FIG. 7 is a flow diagram of a method for conducting cloud assisted cryptography, according to an embodiment of the present invention.

FIG. 7 is a flow diagram of a method 700 for conducting cloud assisted cryptography, according to an embodiment of the present invention. At block 705, a cloud cryptographic service (CCS) receives an invitation from a consuming device to begin a secure communication session. At block 710, a cloud cryptographic service (CCS) provides attestation of security level of the CCS, in response to the invitation.

Optionally, at block 720, the CCS receives an attestation of the consuming device that has initiated the secure session, and the CCS assigns a security level to the consuming device. Advancing to block 730, a transient node of the CCS receives a request from the consuming device to unwrap a wrapped symmetric key. With the request, the CCS transient node receives the wrapped symmetric key, which has been encrypted by a private key. The CCS transient node also receives a wrapped private key that has been encrypted by a public key shared with the CCS (e.g., public key encryption).

Proceeding to block 740, the CCS transient node decrypts the wrapped private key using an asymmetric key associated with the public key encryption. Continuing to block 750, the CCS transient node decrypts the wrapped symmetric key using the (unwrapped) private key. Advancing to block 760, the CCS transient node sends the (decrypted) symmetric key to the consuming device to decrypt an encrypted data file. (Alternatively, the CCS transient node may decrypt the encrypted data file, which is to be returned to the consuming device.) Proceeding to block 770, the CCS transient node destroys a copy of the private key and a copy of the symmetric key that remain at the CCS. The method ends at 780.

Figure 8:
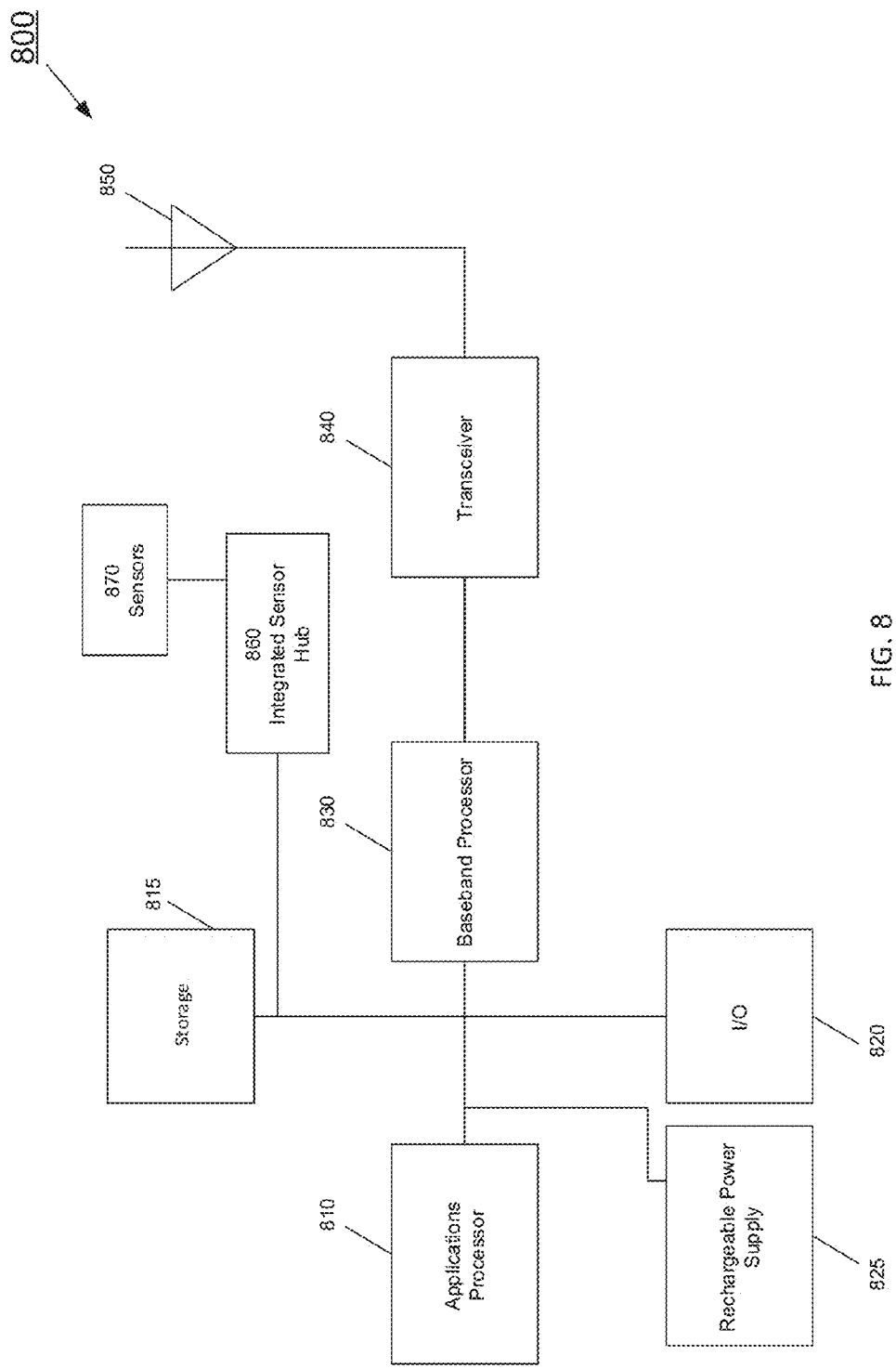
FIG. 8 is a block diagram of a system in accordance with another embodiment of the present invention.

Embodiments can be incorporated into other types of systems including mobile devices such as a cellular telephone, tablet computer, etc. Referring now to FIG. 8, shown is a block diagram of a system in accordance with another embodiment of the present invention. As shown in FIG. 8, system 800 may be a mobile device and may include various components. As shown in the high level view of FIG. 8, an applications processor 810, which may be a central processing unit of the device, is in communication with various components, including a storage 815. The storage 815, in various embodiments, may include both program and data storage portions and can be mapped to provide for secure storage.

Applications processor 810 may further be coupled to an input/output system 820, which in various embodiments may include a display and one or more input devices such as a touch keypad, which itself can appear on the display when executed. The system 800 may also include an integrated sensor hub (ISH) 860 that may receive data from one or more sensors 870.

Applications processor 810 also may couple to a baseband processor 830, which may condition signals such as voice and data communications for output, as well as conditioning incoming telephone and other signals. As seen, baseband processor 830 couples to a transceiver 840, which may enable both receive and transmit capabilities. In turn, transceiver 840 may be in communication with an antenna 850, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard. As seen, system 800 may further include a rechargeable power supply 825 having a rechargeable battery to enable operation in a mobile environment.

In an example, the system 800 may serve as a consuming device, e.g., the consuming device 120 of the system 100 of FIG. 1. As a consuming device, the system 800 may receive an encrypted data file with metadata including an encrypted symmetric key (encrypted with a private key). The system may also receive an encrypted private key (e.g., encrypted via a public key of PKI encryption). The system 800 may establish a secure session with a cloud cryptographic service (CCS), e.g., via attestation, and the system 800 may issue a request to a CCS transient node (not shown) of the CCS to decrypt the encrypted symmetric key. The system 800 may provide the encrypted symmetric key and the encrypted private key to the CCS transient node, in accordance with embodiments of the present invention. The CCS transient node can unwrap the wrapped private key using an asymmetric private key of the public key encryption, and can use the (unwrapped) private key to decrypt the wrapped symmetric key to be returned to the system 800. The system 800 can receive the symmetric key, and can decrypt an encrypted data file using the symmetric key to produce a clear text file, in accordance with embodiments of the present invention.

While shown with this particular implementation in the embodiment of FIG. 8, the scope of the present invention is not limited in this regard.

Other embodiments are described below.

In a first example, a system includes a cloud cryptographic server (CCS) including a processor that includes private key decryption logic to decrypt an encrypted private key received from a consuming device to produce a private key. The processor also includes symmetric key decryption logic to receive the private key from the private key decryption logic and to decrypt an encrypted symmetric key received from the consuming device, where the decryption is executed using the private key. The processor also includes symmetric key decryption logic to receive the private key from the private key decryption logic and to decrypt an encrypted symmetric key received from the consuming device, where the decryption is executed using the private key. The system also includes a dynamic random access memory (DRAM) coupled to the processor.

In a second example that includes the system of example 1, the encrypted private key is encrypted using a public key encryption associated with the cloud cryptographic server.

In a third example that includes the system of example 1, the encrypted private key and the encrypted symmetric key have are received from the consuming device responsive to receipt by the consuming device of an encrypted file that is encrypted with the symmetric key.

In a fourth example that includes the system of example 1, prior to receipt of the encrypted private key and the encrypted symmetric key from the consuming device, the system is to establish a trusted execution environment (TEE).

In a fifth example that includes the system of example 4, establishment of the TEE includes providing attestation of a level of security responsive to an attestation request received from the consuming device.

In a sixth example that includes the system of example 1, prior to receipt of the encrypted symmetric key from the consuming device, the processor is to provide an indication that a level of security of the system is compatible with a level of security of the encrypted symmetric key.

In a seventh example that includes the system of example 1, after decryption of the encrypted symmetric key, the system is to provide the symmetric key to the consuming device.

In an eighth example that includes the system of example 7, the system is to destroy a copy of the private key that resides in the system after the symmetric key is provided to the consuming device.

In a ninth example that includes the system of example 7, the system is to destroy a copy of the symmetric key that resides in the system after the symmetric key is provided to the consuming device.

In a tenth example that includes the system of example 1, the system is to receive an encrypted file from the consuming device, decrypt an encrypted file received from the consumer device using the symmetric key to produce an unencrypted data file, and return the unencrypted data file to the consuming device.

In an eleventh example, a method includes receiving, by a cloud computational server (CCS) that includes at least one processor, a request to decrypt an encrypted symmetric key, receiving the encrypted symmetric key and an encrypted private key comprising a private key that has been encrypted via a public key, and after decrypting the first encrypted private key, decrypting the encrypted symmetric key using the private key to produce a symmetric key.

In a twelfth example that includes the method of example 11, the method includes providing the symmetric key to a consuming device.

In a thirteenth example that includes the method of example 12, the method includes after providing the symmetric key to the consuming device, destroying, by the CCS, a copy of the symmetric key present in the CCS.

In a fourteenth example that includes the method of example 12, the method includes after providing the symmetric key to the consuming device, destroying, by the CCS, a copy of the private key present in the cloud server.

In a fifteenth example that includes the method of example 11, the method includes prior to receiving the encrypted symmetric key, receiving a request for a security attestation from the consuming device, and providing the security attestation responsive to the request.

In a sixteenth example that includes the method of example 11, the method includes prior to providing the symmetric key, receiving a consuming device security attestation from the consuming device.

In a seventeenth example that includes the method of example 15, the encrypted symmetric key is received from the consuming device only when the CCS has a security level based on the security attestation that satisfies a symmetric key security level associated with the symmetric key.

An eighteenth example is an apparatus including means to perform the method of any one of examples 11 to 17.

A nineteenth example is machine readable storage including machine-readable instructions, when executed, to implement the method of any one of examples 11 to 17.

A twentieth example is a system including a processor that includes secure session logic to initiate a secure communication session with a cloud cryptographic service (CCS), provide to the CCS, via the secure communication session, a request to decrypt an encrypted symmetric key that is encrypted via a private key, provide the encrypted symmetric key and an encrypted private key that is encrypted via public key encryption associated with the CCS, and receive, from the CCS, the symmetric key responsive the request of decryption of the encrypted symmetric key. The system also includes a dynamic random access memory (DRAM).

A $21^{st}$ example includes the system of example 20, and the processor further includes decryption logic to decrypt, using the symmetric key, an encrypted data file to produce an unencrypted data file.

A $22^{nd}$ example includes the system of example 20, where the secure session logic is to provide a consuming device security attestation to the CCS prior to establishment of the secure communication session.

A $23^{rd}$ example includes the system of example 20, and where the secure session logic is to receive a CCS security attestation from the CCS prior to establishment of the secure communication session.

A $24^{th}$ example is method including initiating, by a processor of a consuming device, a secure communication session with a cloud cryptographic service (CCS). The method includes providing by the consumer device to the CCS, via the secure communication session, a request to decrypt an encrypted symmetric key, an encrypted private key including a private key that is encrypted via public key encryption associated with the CCS, and the encrypted symmetric key including the symmetric key that is encrypted via the private key. The method includes receiving, from the CCS, the symmetric key responsive the request to decrypt the encrypted symmetric key.

A $25^{th}$ example includes the method of example 24, further including decrypting, using the symmetric key, an encrypted data file to produce an unencrypted data file.

A $26^{th}$ example includes the method of example 24, further including receiving a CCS security attestation from the CCS prior to establishment of the secure communication session.

A $27^{th}$ example includes the method of example 24, further including providing a consuming device security attestation to the CCS prior to establishment of the secure communication session.

A $28^{th}$ example is an apparatus that includes means for performing any one of the methods of examples 24-27.

A $29^{th}$ example is a machine readable storage including machine-readable instructions, when executed, to implement the method of any one of examples 24-27.

A $30^{th}$ example is an apparatus including initiation means for initiating a secure communication session with a cloud cryptographic service (CCS). The apparatus also includes requesting means for providing to the CCS, via the secure communication session, a request to decrypt an encrypted symmetric key, an encrypted private key including a private key that is encrypted via public key encryption associated with the CCS, and the encrypted symmetric key including the symmetric key that is encrypted via the private key. The apparatus also includes receiving means for receiving, from the CCS, the symmetric key responsive the request to decrypt the encrypted symmetric key.

A $31^{st}$ example includes the apparatus of example 30, and further includes decrypting means for decrypting, using the symmetric key, an encrypted data file to produce an unencrypted data file.

A $32^{nd}$ example that includes the apparatus of example 30, the receiving means is further for receiving a CCS security attestation from the CCS prior to establishment of the secure communication session.

A $33^{rd}$ example includes the apparatus of example 30, further includes attestation means for providing a consuming device security attestation to the CCS prior to establishment of the secure communication session.

A $34^{th}$ example is an apparatus including receiving means for receiving a request from a consuming device to decrypt an encrypted symmetric key. The receiving means is further for receiving the encrypted symmetric key and an encrypted private key that includes a private key that has been encrypted via a public key. The apparatus also includes decrypting means for decrypting the first encrypted private key to produce a private key. The decrypting means is also for, after decrypting the first encrypted private key, decrypting the encrypted symmetric key using the private key to produce a symmetric key.

In a $35^{th}$ example that includes the apparatus of example 34, the apparatus further includes outputting means for providing the symmetric key to the consuming device.

In a $36^{th}$ example that includes the apparatus of example 35, the apparatus further includes means for destroying a copy of the symmetric key present in the apparatus after providing the symmetric key to the consuming device.

In a $37^{th}$ example that includes the apparatus of example 36, the apparatus includes means for destroying a copy of the private key present in the apparatus after providing the symmetric key to the consuming device.

In a 38th example that includes the apparatus of example 34, the receiving means is further for receiving a request for a security attestation from the consuming device prior to receiving the encrypted symmetric key, and the apparatus further includes attestation means for providing the security attestation responsive to the request.

In a 39th example that includes the apparatus of example 34, the receiving means is further for receiving a consuming device security attestation from the consuming device prior to receiving the encrypted symmetric key.

In a 40th example that includes the apparatus of example 38, the encrypted symmetric key is received from the consuming device only when the CCS has a security level, based on the security attestation, that satisfies a symmetric key security level associated with the symmetric key.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a hardware processor that includes:
        attestation hardware logic to generate an attestation of a security level of the system responsive to an attestation request received from a consuming device and included in a secure session request and send the attestation to the consuming device to enable a secure session to be established between the system and consuming device;
        private key decryption hardware logic to decrypt an encrypted private key received from the consuming device using a second private key of the system to produce a private key, the encrypted private key encrypted by a content source using a public key of the system; and
        symmetric key decryption hardware logic to receive the private key from the private key decryption hardware logic, decrypt an encrypted symmetric key received from the consuming device, and after decryption of the encrypted symmetric key provide the symmetric key to the consuming device, wherein the decryption is performed using the private key, wherein prior to receipt of the encrypted private key and the encrypted symmetric key from the consuming device, the system is to establish a trusted execution environment (TEE), the system comprising a cloud computational server; and
    a dynamic random access memory (DRAM) coupled to the hardware processor.

2. The system of claim 1, wherein the encrypted private key is encrypted using a public key encryption.

3. The system of claim 1, wherein the encrypted private key and the encrypted symmetric key are received from the consuming device responsive to receipt by the consuming device of an encrypted file that is encrypted with the symmetric key.

4. The system of claim 1, wherein prior to receipt of the encrypted symmetric key from the consuming device, the hardware processor is to provide an indication of the security level of the system that is compatible with a level of security of the encrypted symmetric key.

5. The system of claim 1, wherein the hardware processor is to destroy a copy of the private key that resides in the system after the symmetric key is provided to the consuming device.

6. The system of claim 1, wherein the system is to destroy a copy of the symmetric key that resides in the system after the symmetric key is provided to the consuming device.

7. The system of claim 1, wherein the hardware processor is to:
    receive an encrypted file from the consuming device;
    decrypt the encrypted file using the symmetric key to produce an unencrypted data file; and
    return the unencrypted data file to the consuming device.

8. At least one non-transitory computer readable storage medium comprising instructions that when executed enable a system to perform a method comprising:
    receiving, by a cloud computational server (CCS) that includes at least one hardware processor, a request from a consuming device for a security attestation and providing the security attestation via an attestation hardware logic of the CCS responsive to the request;
    thereafter receiving, by the CCS, a request from the consuming device to decrypt an encrypted symmetric key;
    receiving the encrypted symmetric key and an encrypted private key comprising a private key that has been encrypted by a content source via a public key of the CCS;
    decrypting, in a private key decryption hardware logic of the CCS, the first encrypted private key using a second private key of the CCS to produce the private key; and
    after decrypting the first encrypted private key, decrypting, in a symmetric key decryption hardware logic of the CCS, the encrypted symmetric key using the private key to produce a symmetric key.

9. The at least one non-transitory computer readable storage medium of claim 8, wherein the method further comprises providing the symmetric key to the consuming device.

10. The at least one non-transitory computer readable storage medium of claim 9, wherein the method further comprises after providing the symmetric key to the consuming device, destroying, by the CCS, a copy of the symmetric key present in the CCS.

11. The at least one non-transitory computer readable storage medium of claim 9, wherein the method further comprises after providing the symmetric key to the consuming device, destroying, by the CCS, a copy of the private key present in the CCS.

12. The at least one non-transitory computer readable storage medium of claim 8, wherein the method further comprises prior to receiving the encrypted symmetric key, receiving a consuming device security attestation from the consuming device.

13. The at least one non-transitory computer readable storage medium of claim 12, wherein the encrypted symmetric key is received from the consuming device only when the CCS has a security level, based on the security attestation, that satisfies a symmetric key security level associated with the symmetric key.

14. A system comprising:
a hardware processor including:
  secure session hardware logic to:
    provide a consuming device security attestation to a cloud cryptographic service (CCS) prior to establishment of a secure communication session;
    initiate the secure communication session with the CCS;
    provide to the CCS, via the secure communication session, a request to decrypt an encrypted symmetric key that is encrypted by a content source via a private key, the encrypted symmetric key, and an encrypted private key including the private key that is encrypted via public key encryption associated with the CCS; and
    receive, from the CCS, the symmetric key responsive the request to decrypt the encrypted symmetric key; and
  decryption hardware logic to decrypt, using the symmetric key, an encrypted data file to produce an unencrypted data file; and
a dynamic random access memory (DRAM).

15. The system of claim 14, wherein the system comprises a wireless communication device.

16. The system of claim 15, wherein the wireless communication device comprises:
an applications processor;
a baseband processor coupled to the applications processor; and
a transceiver coupled to the baseband processor to communicate with an antenna.

* * * * *